United States Patent [19]

Shinmoto et al.

[11] Patent Number: 5,928,842
[45] Date of Patent: Jul. 27, 1999

[54] MARKING METHOD

[75] Inventors: Masaki Shinmoto; Shoiti Hayashihara, both of Yono, Japan

[73] Assignee: Nippon Kayaku Kabushiki Kaisha, Tokyo, Japan

[21] Appl. No.: 08/798,455

[22] Filed: Feb. 10, 1997

Related U.S. Application Data

[63] Continuation-in-part of application No. 08/389,171, Feb. 15, 1995, abandoned.

[30] Foreign Application Priority Data

Feb. 24, 1994 [JP] Japan .................................. 6-050012

[51] Int. Cl.$^6$ ....................................... G03C 5/16
[52] U.S. Cl. ......................... 430/346; 430/945; 430/944
[58] Field of Search ..................... 430/346, 945, 430/944

[56] References Cited

U.S. PATENT DOCUMENTS

| 4,401,992 | 8/1983 | Vorsi et al. ............................. 346/76 L |
| 4,510,512 | 4/1985 | Okamoto et al. ........................ 346/209 |
| 4,578,329 | 3/1986 | Holsappel ................................. 430/18 |
| 5,035,983 | 7/1991 | Kiyonari et al. ......................... 430/346 |
| 5,075,195 | 12/1991 | Babler et al. ............................ 430/200 |
| 5,445,271 | 8/1995 | Kakizaki et al. ....................... 206/459.5 |

FOREIGN PATENT DOCUMENTS

| 32595/84 | 3/1985 | Australia . |
| 0 036 680 | 9/1981 | European Pat. Off. . |
| 0 111 357 | 6/1984 | European Pat. Off. . |
| 0 447 032 | 9/1991 | European Pat. Off. . |
| 60-110737 | 6/1985 | Japan . |
| 60-226554 | 11/1985 | Japan . |
| 4-267191 | 9/1992 | Japan . |
| 5-92657 | 4/1993 | Japan . |
| 5-254252 | 10/1993 | Japan . |
| 6-48042 | 2/1994 | Japan . |

OTHER PUBLICATIONS

922 Modern Plastics International 23 (1993) Oct., No. 10,Lausanne,CH.
Derwent Abstract Accession No. 18748E/10, Class A17 E36, JP 57018–747A (Tokuyama Soda KK) Jul. 7, 1980 Abstract.
Derwent Abstract Accession No. 39925 E/20, Class A17, Jp 57057–738 A (Tsujino T) Apr. 7, 1982 Abstract.
Derwent Abstract Accession No. 41843 W/25, Class A17, JP 50016744 A (Toray Inds KK) Feb. 21, 1975 Abstract.
Derwent Abstract Accession No. 87–302911/43, Class A17 E11, JP 62212–445 A (Asahi Chemical Ind KK) Sep. 18, 1987 Abstract.
Derwent Abstract Accession No. 89–097171/13, Class A17, Jp 01045–447A (Mitsui Toatsu Chem Inc) Feb. 17, 1989 Abstract.
Derwent Abstract Accession No. 89–288598/40, Class A17B07, JP 01210–442A (Idemitsu Petrochem KK) Aug. 24, 1989 Abstract.
Derwent Abstract Accession No. 90–249843/33, Class A17, JP 02173–139 A (Tokuyama Soda KK) Jul. 4, 1990 Abstract.
Derwent Abstract Accession No. 93–061754/08, Class A17 E36, Jp 05009349 A (Tokuyama Soda KK) Jan. 19, 1993 Abstract.
Derwent Abstract Accession No. 93–071238/09, Class A17E12, JP 05017638A (Tokuyama Soda KK) Jan. 26, 1993 Abstract.

*Primary Examiner*—John A. McPherson
*Attorney, Agent, or Firm*—Nields, Lemack & Dingman

[57] ABSTRACT

The present invention provides a polyolefin resin-based marking composition capable of developing a vivid color in dark brown to black on irradiation with laser beams, moldings of the composition, and a laser marking method. The marking composition comprises a polyolefin resin-based marking composition containing from 0.005% by weight to less than 0.5% by weight of a silicon compound based on the polyolefin resin.

8 Claims, No Drawings

MARKING METHOD

This application is a Continuation-In-Part of application Ser. No. 08/389,171 filed Feb. 15, 1995, now abandoned.

FIELD OF THE INVENTION

The present invention relates to a marking composition, moldings thereof and a marking method. More particularly, it relates to a polyolefin resin-based marking composition capable of developing vivid colors from dark brown to black on irradiation with laser beam, moldings of such a composition, and a marking method using laser beams.

BACKGROUND OF THE INVENTION

Recently, for marking of letters and signs such as maker's name, product name, date of production, etc., on the surfaces of various commercial articles, for example, electronic parts such as IC's, resistors, condensers, inductors, etc., electrical parts such as relays, switches, connectors, printed circuit boards, etc., housings of electrical devices, automobile parts, machine parts, cables, sheets, packaging sheets, cards, various containers of foods, cosmetics, toiletaries and medicines, caps of containers, etc., the laser marking system is popularly employed for its various advantages such as non-contact quick marking and easiness of automation and process management.

In laser marking, laser beams are applied directly to the surface of an objective article made of a high-molecular organic material, metal or other substance to cause a change of state of the article surface or discoloration or decoloration of the colorant in the irradiated area, and marking is done by making use of such chemical changes. This marking method, however, has certain problems in practical applications. For example, in case of using a polyolefine resin as base material for marking, the laser beams may pass through the resin, failing to perform desired marking thereon, or even when the laser beams are absorbed to cause etching, it may happen that the resin be simply melted and no clear marking can be accomplished. Also, even when a colorant is used, vivid color development may fail to take place.

In order to solve these problems when a laser marking method is applied on polyolefin resin molded articles, many researches have been made on the color formers capable of developing vivid colors. For example, there have been proposed use of yellow iron oxide as color former in JP-A-60-155493, use of inorganic lead compounds in JP-A-61-69488 and JP-A-1-3062285, use of manganese violet and cobalt violet in JP-A-2-204888 and use of compounds of metals such as mercury, cobalt, copper, bismuth and nickel in U.S. Pat. No. 4,861,620. However, these compounds involve the serious problems in practical use, such as safety and influence on the environment, as they are basically composed of heavy metals. Also, in the case of heavy metals such as yellow iron oxides, since the compounds themselves are tinted, it is impossible to use resins colored in various hues and accordingly the scope of their use is limited. JP-A-60-110737 proposes use of pearlescent pigments as non-tinted compounds, but since these compounds have iridescent luster although not tinted, they may develop a foreign color tone when applied to an article for which no pearly luster is needed.

Even as a color former, there is no complete colorless one. Therefore, there are such problems that if the amount of color former increases, the products to be marked are influenced in hue and color tone, the viscosity of the resin composition increases and the resin composition is influenced in its moldability, the abrasion property increases and the molding machine and kneader are injured by the abrasion at the molding. Accordingly, even if the color former itself is colorless and its amount to be used is a very little, a marking composition to be colored in a clear dark brown to black by laser beam is required.

SUMMARY OF THE INVENTION

In order to solve the problems mentioned above, the present inventors conducted extensive studies, and attained the present invention.

That is, the present invention relates to the followings:

(1) A polyolefin resin marking composition containing from 0.005% by weight to less than 0.5% by weight of a silicon compound based on the polyolefin resin.

(2) A polyolefin resin marking composition according to item (1), wherein the silicon compound is an inorganic silicon compound.

(3) A palyolefin resin marking composition according to item (2), wherein the inorganic silicon compound is a silicon dioxide type compound.

(4) A polyolefin resin marking composition according to item (3), wherein the silicon dioxide type compound is mica, kaolin, blast furnace slag, silicious sand, diatomaceous earth or talc.

(5) A polyolefin resin marking composition according to item (1), wherein the polyolefin resin is a polyethylene or a polypropylene.

(6) A polyolefin resin marking composition according to item (1), wherein an weight average particle diameter of the silicon compound is $10\mu$ or less.

(7) A polyolefin resin marking composition according to item (1), which contains from 20 to 1000% by weight of titanium oxide based on the total amount of the silicon compound.

(8) A resin molded article which is formed by molding the polyolefin resin marking composition according to item (1).

(9) A resin molded article according to item (8), wherein the resin molded article is containers.

(10) A resin molded article according to item (8), wherein the molded article is films.

(11) A marking method of a resin molded article which comprises irradiating a laser beam to the resin molded article of items (8) to (10).

(12) A marking method according to item (11), wherein the laser beam is an infrared ray laser beam.

(13) A marking method according to item (12), wherein the infrared ray laser beam is a far infrared ray laser beam.

(14) A marking method according to item (11), wherein the energy of laser beam on the surface of resin molded article is 2.5–20 $J/cm^2$.

(15) A masterbatch for resin molded article according to item (8), wherein from 0.5 to 5% by weight of a silicon compound is contained based on the polyolefin resin.

(16) A polyolefin resin marking composition containing from 0.005% by weight to less than 2% by weight of mica based on the polyolefin resin.

(17) A polyolefin resin marking composition containing from 0.005% by weight to less than 1% by weight of mica based on the polyolefin resin.

(18) A polyolefin resin marking composition according to item 16 or 17, wherein the polyolefin resin is a polyethylene or a polypropylene.

(19) A resin molded article formed by molding the polyolefin resin marking composition according to items 16 to 18.

(20) A resin molded article according to item 19, wherein the resin molded article is containers.

(21) A resin molded article according to item 19, wherein the resin molded article is films.

(22) A marking method of a resin molded article comprising irradiating an infrared ray laser beam to the resin molded article of items 19 to 21.

(23) A marking method according to item 22, wherein the infrared ray laser beam is a far infrared ray laser beam.

(24) A marking method according to item 22, wherein the energy of the infrared ray laser beam on the surface of the resin molded article is 2.5–20 J/cm$^2$.

(25) A polyolefin resin marking composition according to item (1), wherein the content of the silicon compound is from 0.005% by weight to 0.4% by weight based on the polyolefin resin.

DETAILED DESCRIPTION OF THE INVENTION

The marking composition, moldings thereof and marking method according to the present invention are explained in detail below.

Typical examples of the polyolefin resins usable for the marking composition of the present invention are polyethylene and polypropylene. The polyolefin resins used in the present invention are preferably one whose melt index (MI) is in the range of about 0.01 to 60, preferably about 0.02 to 55.

The silicon compound used in the present invention is uncoated one and acts as a color former, especially color former developing dark brown to black in laser marking. The silicon compounds preferably include inorganic silicon compound, specifically silicon dioxide, maicas, kaolins, blast furnace slag, silicious sand, diatomaceous earth, talc, etc. The micas usable in the present invention includes micas belonging to the muscovite series such as common mica, lepidolite, paragonite, sericite, roscoelite and illite; biotite series such as biotite, phlogopite, lepidomelane and zinwaldite; natural micas such as glauconite, celadonite, muscovite, suzorite, palagonite and vermiculite; and synthetic micas. Of these micas, muscovite, phlogopite, suzorite and synthetic micas are preferred. Silicon dioxide may be hydrous state or unhydrous state, and includes, for example, crystalline state, amorphous state, glass state, colloidal state and the like. Amorphous or colloidal state ones are preferable in view of low abrasion property. The kaolins usable in the present invention comprises the kaolins having a kaolin type layer structure. Such kaolins includes kaolin, kaolinite, nacrite, dickite, halloysite, hydrated halloysite, metahalloysite, endellite, anauxite, and some groups of chrysotile, cronstedtite, antigorite, amesite and chamosite. Kaolin and kaolinite are preferred. Blast furnace slag is a released substance from the iron-manufacturing smelting furnaces. It is a melt produced from reaction of the impurities in iron and steel with ash of coke or limestone. The main components of the slag are CaO, SiO$_2$ and Al$_2$O$_3$. Al$_2$O$_3$ accounts for 10 to 20% of the whole slag, the rest being mostly occupied by CaO and SiO$_2$. The slag in which the CaO:SiO$_2$ ratio by weight is greater than 1 is called basic slag and the one in which said ratio is smaller than 1 is called acidic slag. Both basic slag and acidic slag can be used as a color former. Siliceous sand is a sand mainly composed of quartz particles. It consists of more than 90% of SiO$_2$ and small quantities of other mineral substances such as feldspar, zircon and magnetite.

Diatomaceous earth usable in the present invention is a siliceous deposit composed of the remains of diatom which is a single cell algae, the main component thereof being hydrous amorphous silicon dioxide. It may have mixed therein clay, volcanic ash and organic materials. As for the color of this substance, white color is preferred so that the substance may adapt itself to the various color tones ranging from white to yellowish gray of the resin moldings.

Talc used in this invention is a hydrous silicate of magnesium and has the composition of Mg$_2$Si$_4$O$_{10}$(OH)$_2$.

The above-defined silicon compounds can be used in combination.

The weight-average particle size of the silicon compound (s) used in the present invention is not specified, but in view of influence on the color tone of the resin, it should be not greater than 700μ, preferably not greater than 10μ, more preferably in the range of about 0.5 to 10μ.

The amount of the silicon compound to be used is from 0.005% by weight to less than 0.5% by weight, preferably from about 0.005% by weight to 0.4% by weight, more preferably from about 0.005% by weight to less than 0.3% by weight, and most preferably from about 0.01% by weight to about 0.2% by weight. As to micas, the amount to be used may be the above-mentioned range, and it may be from 0.005% by weight to less than 2% by weight, preferably from about 0.005% by weight to less than 1% by weight, more preferably from about 0.01% by weight to less than 1% by weight, and the most preferably from about 0.01% by weight to about 0.8% by weight. As to kaolin, the amount to be used may be the above-mentioned range, but it may be from about 0.08% by weight to less than 0.3% by weight.

In the present invention, when said silicon compound(s) alone is used, the composition develops a dark brown color, but when titanium dioxide is added, the reddish tinge of the dark brown color is eliminated to present a gray to black color, enhancing vividness of the formed mark. Any of the commercial products of titanium dioxide can be used in the present invention, but when no transparency of the mark is required and development of a black color is desired, it is recommended to use the type of titanium dioxide which is commercially sold as pigment material, and when it is desired to form a grayish color while maintaining transparency of the mark, it is recommended to use particulate titanium dioxide. Both rutile type and anatase type titanium dioxide can be used as pigment material. Particulate titanium dioxide designates titanium dioxide having a particle size less than 0.1μ. A commercial product of such particulate titanium dioxide is available from TAYCA CORPORATION under the trade name of MT-500B. The amount of titanium dioxide used in the composition of this invention is not specified, but preferably this compound is used in as small an amount as possible for the economical reason. Usually its amount may be less than 1,000% by weight based on said silicon compound, but when fine particle titanium dioxide is used, its amount is preferably about 20 to 1,000% by weight based on said silicon compound. When titanium dioxide is used in an excess amount, the opacifying properties of titanium oxide will be resuscitated to weaken the developed color tone, so that it is preferred to limit the amount of titanium dioxide used within a range of about 20 to 400% by weight, more preferably about 30 to 300% by weight, depending on the desired color tone of the mark.

The marking composition of the present invention may contain additives as desired. Such additives include colorants, fillers, lubricants, plasticizers, etc.

The colorants usable in the present invention are not specifically restricted, but the colorants other than black type are preferable. For example, said colorants include various types of organic pigments such as phthalocyanine pigments, azo pigments, diazo pigments, quinacridone pigments, anthraquinone pigments, flavanthrone yellow, perinone orange, perylene scarlet pigments, dioxazine violet pigments, condensed azo pigments, azomethine pigments and methine pigments, and inorganic pigments such as titanium oxide, lead sulfate, zinc oxide, chrome yellow pigments, zinc yellow pigments, chrome vermilion, red iron oxide, cobalt purple, Prussian blue, chrome green, chrome oxide and cobalt green. These organic and inorganic pigments are added within limits not affecting the vividness of the color mark formed, for example in an amount of 0.001 to 3% by weight based on the polyolefin resin. Incidentally, even the black type colorants, they are usable within the limited range so long as they do not affect the vividness of the formed color mark.

The fillers usable in the present invention include those ordinarily used in the polyolefin resin compositions, such as calcium carbonate, alumina, and glass fiber. Filler is added within limits not affecting the vividness of the formed color mark, for example in an amount of 0.001 to 3% by weight based on the polyolefin resin.

The lubricants usable in the present invention include stearic acid, behenic acid and its esters or salts, waxes such as carnauba wax and polyethylene wax, and various types of surfactants. Lubricant is added as desired in an amount of usually 0.1 to 5.0% by weight based on the polyolefin resin. As plasticizer, there can be used esters of phthalic acid, phosphoric acid, sebacic acid and the like. Other additives normally used in plastics processing, such as antioxidant, heat stabilizer, light stabilizer, flame retardant, etc., can also be incorporated in the composition of the present invention. These additives may be used in the form of powder or as a masterbatch in the preparation of the polyolefin resin-based marking composition of the present invention.

The polyolefin resin marking composition of the present invention can be obtained by adding a silicon compound to a base polyolefin resin, further adding, as desired, titanium dioxide and, if necessary, other additive(s) such as colorant, filler, lubricant, plasticizer, heat stabilizer, etc., and uniformly mixing and kneading said materials by using mixer such as an extruder, a twin-screw kneader and a roll mill.

Further, the polyolefin resin marking composition according to the present invention can be obtained by first producing a masterbatch containing a silicon compound in high concentration and then adding thereto a polyolefin resin, and additives such as fillers if desired, and then mixing and kneading them uniformly by using a mixing and kneading machine. The thus obtained composition of the present invention is molded in the form as it is and, if necessary, further blended with appropriate auxiliaries such as polyolefin resin and filler, by a per se known method to obtain a resin molding.

Indicentally, a masterbatch containing a silicon compound in high concentration can be obtained by adding, to a polyolefin resin, a silicon compound and titanium dioxide if desired and additives such as a color former, filler, lublicant, plasticizer, heat-stabilizer, and the like, if necessary, mixing and kneading them uniformly by using a mixing and kneading machine such as an extruder, twin-screw kneader, roll mill, etc., and then processing the mixture into a desired form such as pellets or marbles. The content of said silicon compound(s) in the masterbatch is preferably about 0.5 to 5% by weight, more preferably 0.5 to 2% by weight based on the polyolefin resin.

The resin moldings include two-dimensional moldings such as films and three-dimensional moldings such as containers, caps, parts, etc.

The two-dimensional moldings such as film can be produced by a known method for forming a film of thermoplastic resin, such as inflation method, multiple-layer inflation method, T-die film forming method, flat film forming method using simultaneous or successive biaxial stretching technique, tubular film forming method, etc. The thus produced films can be applied to the same field of use as the ordinary thermoplastic resin films, such as food packages, textile packages, haberdashery packages, packages of chemicals, tapes, insulating materials, agricultural films, various types of sheets, various types of seals, labels, etc. Also, the films produced according to the present invention can be laminated on various types of substrates, for example, paper such as craft paper or slick paper, plastic films, metal foils such as aluminum foil, etc., and the thus obtained laminates can be applied to various uses such as containers of foods or drinks such as milk, alcoholic beverages, etc., medicinal packages, food packages, various types of sheets, various types of seals, labels, etc.

The three-dimensional moldings using the polyolefin resin-based laser marking composition according to the present invention can be produced by known methods such as injection molding, extrusion molding, blow molding, rotational molding, expansion molding, powder molding, vacuum molding, etc., an appropriate method being selected according to the type of the molding to be produced. Such three-dimensional moldings include the ordinary commercial articles mainly composed of thermoplastic resins, for example, containers of foods, detergents, medicines, cosmetics, drinking water, drinks, etc., caps of such containers, food trays, tubing, medical vessels, clothing articles, housings of domestic electrical appliances, electrical parts, home appliances, automobile parts such as bumper, interior trims, audio articles such as tape cassette, information processing articles such as floppy disc, pipes, building materials, industrial parts, various types of containers, clothing containers, multi-layered containers, haberdasheries, various types of business machines, stationary, etc.

When laser beam is applied to the surface of a two-dimensional or three-dimensional molding such as mentioned above, a dark brown to black mark with a vivid contrast is formed at the irradiated portion. The laser beam used for irradiation may be far-infrared laser such as carbon dioxide laser (wavelength: approx. 10,600 nm), near-infrared laser such as YAG laser (wavelength: approx. 1,060 nm), excimer laser or the like, but infrared laser, especially far-infrared laser is preferred.

As the laser beam intensity, for example, in case of TEA carbon dioxide gas laser, the energy density at the irradiation source is about 0.5 to 1 $J/cm^2$, and the energy density irradiated on the surface of resin molded article according to the present invention is, for example, 2.5–20 $J/cm^2$, preferably 2.8–16 $J/cm^2$, and more preferably 3.5–16 $J/cm^2$. The energy density (Ed) at the irradiated portion becomes higher than that of irradiation source, because the laser beam is condensed to irradiate to the surface of resin molded article. The energy density can be obtained by the following calculation formula:

$$Ed = \frac{\text{(Total energy intensity at irradiation source)}}{\text{(Irradiation area when no mask is used)}}$$

The color former used in the present invention is small in quantity, so that it scarcely gives any adverse effect to the quality and workability of the resin.

The present invention is described more particularly in the following Examples, but it should be recognized that the scope of the present invention is not restricted to these Examples. In the following Examples, ⊚ indicates that a dark brown or black mark with excellent vividness was obtained, ○ indicates that a dark brown or black mark with good vividness was obtained, and x indicates that the vividness of the mark was bad or there was merely obtained a white mark.

REFERENTIAL EXAMPLE 1

100 ml of glass beads (1 mmΦ), 100 g of mica (Kuralite mica 600W produced by Kuraray Co., Ltd.; average particle size: 8μ) and 186 g of ethyl alcohol were supplied and treated in a 500 ml ceramic sand mill for 8 hours. Then the glass beads were filtered out, ethyl alcohol was removed by evaporation under reduced pressure and the resultant product was dried to obtain 99 g of particulate mica having an average particle size of 2μ.

EXAMPLE 1

1,000 parts of polyethylene (SHOWLEX S5003BH produced by Showa Denko Co., Ltd.; MI: 0.3) and 0.5 parts of mica (Kuralite mica 600W; average particle size: 8μ) were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film at 180° C. by using a 50-ton press and marking was carried out on the surface of said film by using carbon dioxide laser (XY mark 7000 mfd. by Coherent Hull) to obtain a vivid dark brown mark (⊚).

EXAMPLE 2

1,000 parts of polyethylene (SHOWLEX S5003BH; MI: 0.3) and 5 parts of fine particle mica obtained in Referential Example 1 were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film at 180° C. by using a 50-ton press and marking was conducted on the surface of said film by using carbon dioxide laser (XY mark 7000) to obtain a vivid dark brown mark (⊚).

EXAMPLE 3

1,000 parts of polyethylene (SHOWLEX S5003BH; MI: 0.3), 5 parts of mica (Kuralitemica 30C produced by Kuraray Co., Ltd.; average particle size: 680μ) and 5 parts of titanium dioxide for pigment (TIPAQUE CR-60 produced by Ishihara Sangyo KK) were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film at 180° C. by using a 50-ton press and marking was performed on the surface of said film to obtain a vivid black mark (⊚).

EXAMPLE 4

1,000 parts of polyethylene (UP POLYETHYLENE J110K produced by Chisso Corp.; MI: 10), 1 part of fine particle mica obtained in Referential Example 1 and 10 parts of particulate titanium dioxide (MT-500B produced by TAYCA CORPORATION) were kneaded by a twin-screw kneader at 160° C. and ground by a ROTOPLEX CUTTING MILL, and then the particles smaller than 1 mm in major diameter were eliminated to obtain a marking composition of the present invention. This composition was molded into a plate at 150° C. by using an injection molding machine (SAV-40 mfd. by Yamashiro Fine Machinery Co., Ltd. hereinafter said machine is referred to as "SAV-40") and marking was done on the surface of said plate by using carbon dioxide laser (XY mark 7000) to obtain a vivid grayish black mark (⊚).

EXAMPLE 5

1,000 parts of polypropylene (TONEN POLYPROPYLENE J215 produced by Tonen Corp.; MI: 15) and 1 part of mica (Suzolite mica 325S produced by Kuraray Co., Ltd.; average particle size: 40μ) were kneaded by a twin-screw kneader at 220° C. and ground by a ROTOPLEX CUTTING MILL, and then the particles smaller than 1 mm in major diameter were eliminated to obtain a marking composition of the present invention. This composition was molded into a plate at 220° C. by using an injection molding machine (SAV-40) and marking was conducted on the surface of said plate by using carbon dioxide laser (XY mark 7000) to obtain a vivid dark brown mark (○).

EXAMPLE 6

1,000 parts of polypropylene (CHISSO POLYPROPYLENE K-8140T produced by Chisso Corp.; MI: 40) and 2 parts of kaolin (average particle size: 2μ) were kneaded by a twin-screw kneader at 220° C. and ground by a ROTOPLEX CUTTING MILL, and then the particles smaller than 1 mm in major diameter were eliminated to obtain a marking composition of the present invention. This composition was molded into a plate at 220° C. by using an injection molding machine (SAV-40) and marking was performed on the surface of said plate by using carbon dioxide laser (XY mark 7000) to obtain a dark brown mark (○).

EXAMPLE 7

1,000 parts of polypropylene (ASAHI KASEI POLYPROPYLENE E100 produced by Asahi Chemical Industry Co., Ltd.; MI: 0.5) and 5 parts of artificial mica (MK-100 produced by CO-OP Chemical Co., Ltd.; average particle size: 2.5μ) were kneaded by a twin-screw kneader at 220° C. and ground by a ROTOPLEX CUTTING MILL, and then the particles smaller than 1 mm in major diameter were eliminated to obtain a marking composition of the present invention. This composition was press molded into a 0.5 mm thick film at 200° C. by using a 50-ton press and marking was practiced on the film surface by using carbon dioxide laser (XY mark 7000) to obtain a vivid dark brown mark (⊚).

EXAMPLE 8

1,000 parts of polyethylene (UP POLYETHYLENE J110K produced by Chisso Corp.; MI: 10), 0.3 parts of mica (KURALITE MICA 600W; average particle size: 8μ) and 0.3 parts of titanium dioxide (TIPAQUE R-820) were kneaded by a twin-screw kneader at 160° C. and ground by a ROTOPLEX CUTTING MILL, and then the particles smaller than 1 mm in major diameter were eliminated to obtain a marking composition of the present invention. This composition was molded into a plate by an injection molding machine (SAV-40) at 150° C. and marking was performed on the plate surface by using carbon dioxide laser (XY mark 7000) to obtain a vivid grayish black mark (⊚).

EXAMPLE 9

1,000 parts of polyethylene (SHOWLEX S5003BH; MI: 0.3) and 1 part of blast furnace slag (average particle size: 8μ) were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film by a 50-ton press at 180° C. and marking was carried out on the film surface by using carbon dioxide laser (XY mark 7000) to obtain a vivid dark brown mark (o).

EXAMPLE 10

1,000 parts of polyethylene (SHOWLEX S5003BH; MI: 0.3) and 1 part of siliceous sand (average particle size: 10μ) were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film by a 50-ton press at 180° C. and marking was performed on the film surface by using carbon dioxide laser (XY mark 7000) to obtain a vivid dark brown mark (⊚).

EXAMPLE 11

1,000 parts of polyethylene (SHOWLEX S5003BH; MI: 0.3) and 1 part of diatomaceous earth (average particle size: 6μ) were kneaded by a twin-screw kneader at 200° C. and ground by a ROTOPLEX CUTTING MILL, and then the particles smaller than 1 mm in major diameter were eliminated to obtain a marking composition of the present invention. This composition was press molded into a 0.5 mm thick film at 1800° C. by using a 50-ton press and marking was conducted on the film surface by using carbon dioxide laser (XY mark 7000) to obtain a vivid dark brown mark (⊚).

EXAMPLE 12

1,000 parts of polyethylene (UP POLYETHYLENE J110K produced by Chisso Corp.; MI: 10), 3 parts of blast furnaces lag and 10 parts of particulate titanium dioxide (MT-500B produced by TAYCA CORPORATION) were kneaded by a twin-screw kneader at 160° C. and ground by a ROTOPLEX CUTTING MILL, and then the particles smaller than 1 mm in major diametere were eliminated to obtain a marking composition of the present invention. This composition was molded into a plate at 150° C. by using an injection molding machine (SAV-40) and marking was carried out on the plate surface by using carbon dioxide laser (XY mark N7000) to obtain a vivid black mark (⊚).

EXAMPLE 13

1,000 parts of polyethylene (UP POLYETHYLENE J110K produced by Chisso Corp.; MI: 10) and 1 part of talc (average particle size: 2μ) were kneaded by a twin-screw kneader at 160° C. and ground by a ROTOPLEX CUTTING MILL, and then the particles smaller than 1 mm in major diametere were eliminated to obtain a marking composition of the present invention. This composition was molded into a plate by an injection molding machine (SAV-40) at 150° C. and marking was performed on the plate surface by using carbon dioxide laser (XY mark 7000) to obtain a vivid dark brown mark (⊚).

COMPARATIVE EXAMPLE 1

1,000 parts of polyethylene (SHOWLEX S5003BH; MI: 0.3) and 50 parts of mica (Kuralite mica 600W; average particle size: 8μ) were kneaded by a twin-screw kneader at 200° C. and ground by a ROTOPLEX CUTTING MILL, and then the particles smaller than 1 mm in major diameter were eliminated to obtain a marking composition for comparison. This composition was press molded into a 0.5 mm thick film at 180° C. by using a 50-ton press and marking was carried out on the film surface by using carbon dioxide laser (XY mark 7000). There was merely obtained a white mark (x).

COMPARATIVE EXAMPLE 2

Polyethylene (SHOWLEX S5003BH; MI: 0.3) was press molded into a 0.5 mm thick film at 180° C. by using a 50-ton press and marking was performed on the film surface by using carbon dioxide laser (XY mark 7000). No mark could be formed (x).

COMPARATIVE EXAMPLE 3

1,000 parts of polyethylene (SHOWLEX S5003BH; MI: 0.3) and 50 parts of talc (average particle size: 2μ) were kneaded by a twin-screw kneader at 200° C. and ground by a ROTOPLEX CUTTING MILL, and then the particles smaller than 1 mmin major diameter were eliminated to obtain a marking composition of the present invention. This composition was press molded into a 0.5 mm thick film by a 50-ton press at 180° C. and marking was performed on the film surface by using carbon dioxide laser (XY mark 7000). There was merely obtained a white mark (x).

EXPERIMENTAL EXAMPLE

Polyethylene (SHOLEX S5003BH, manufactured by Showa Denko), was mixed with a color former in a predetermined amount and kneaded. From the mixture, a specimen was produced in a form of plate. The marking was conducted on the surface of the specimen by irradiating a laser beam by using carbon dioxide laer (manufactured by Laser Technique Co., Blayzer 6000, output 26.1 Kv, total energy 3.8 J) to find relation between the energy density and the vividness of mark formed. The results obtained are shown in Table 1. In Table 1, o indicates that a vivid dark brown mark was obtained, Δ indicates that the mark formed is distinguishable dark brown, and x indicates that the mark formed is not distinguishable.

TABLE 1

| No. | Color former | Added amount (%) | Energy density at irradiated portion (J/cm$^2$) | | | | |
| --- | --- | --- | --- | --- | --- | --- | --- |
| | | | 2.2 | 2.9 | 4.1 | 6.5 | 8.6 |
| 1 | Mica | 0.1 | x | Δ | o | | |
| | | 0.3 | x | o | | | |

TABLE 1-continued

| No. | Color former | Added amount (%) | Energy density at irradiated portion (J/cm$^2$) | | | | |
|---|---|---|---|---|---|---|---|
| | | | 2.2 | 2.9 | 4.1 | 6.5 | 8.6 |
| 2 | Kaolin | 0.1 | | x | Δ | ○ | |
| | | 0.3 | x | Δ | ○ | | |
| 3 | Blast furnace slag | 0.1 | | x | Δ | ○ | |
| | | 0.3 | x | Δ | ○ | | |
| 4 | Talc | 0.1 | | x | Δ | ○ | |
| | | 0.3 | x | Δ | ○ | | |
| 5 | Silicon dioxide | 0.1 | | | x | Δ | ○ |
| | | 0.3 | | | x | Δ | ○ |

According to the present invention, a laser irradiated portion of polyolefin resin was colored in dark brown to black even though the amount of color former to be added is as small as less than 0.5% by weight based on the polyolefin resin without affecting the color hue or tone of the product to be marked, and without affecting physical properties such as moldability, abrasion property, etc. of the resin composition to be used.

What is claimed is:

1. A marking method for forming a dark brown to black mark on the surface of a resin molded article comprising irradiating an infrared ray laser beam to the resin molded article formed by molding a polyethylene resin marking composition containing from 0.005% by weight to less than 2% by weight of uncoated mica based on the polyethylene resin.

2. A marking method according to claim 1, wherein a weight average particle diameter of the uncoated mica is 10μ or less.

3. A marking method according to claim 1, which contains 20–1000% by weight of titanium oxide based on the total amount of the uncoated mica.

4. A marking method according to claim 1 wherein said polyethylene resin marking composition contains from 0.005% by weight to less than 1% by weight of uncoated mica based on the polyethylene resin.

5. A marking method according to claim 1, wherein the resin molded article is a container.

6. A marking method according to claim 1, wherein the resin molded article is film.

7. A marking method according to claim 1, wherein the infrared ray laser beam is a far infrared ray laser beam.

8. A marking method according to claim 1, wherein the energy of the infrared ray laser beam on the surface of the resin molded article is 2.5–20 J/cm$^2$.

* * * * *